US012703631B2

(12) United States Patent
Chae et al.

(10) Patent No.: US 12,703,631 B2
(45) Date of Patent: Aug. 11, 2026

(54) METHOD OF PRODUCING LITHIUM SULFIDE WITHOUT USING HYDROGEN SULFIDE GAS

(71) Applicants: Hyundai Motor Company, Seoul (KR); Kia Corporation, Seoul (KR); Korea Institute of Science and Technology, Seoul (KR)

(72) Inventors: Mun Seok Chae, Busan (KR); Hong Seok Min, Yongin-si (KR); Sang Heon Lee, Yongin-si (KR); Sang Soo Lee, Goyang-si (KR); Ho Cheol Shin, Seoul (KR); Wo Dum Jung, Seoul (KR); In Woo Song, Gwacheon-si (KR); So Young Kim, Jeongeup-si (KR); Young Whan Cho, Seongbuk-gu (KR)

(73) Assignees: Hyundai Motor Company, Seoul (KR); Kia Corporation, Seoul (KR); Korea Institute of Science and Technology, Seoul (KR)

( * ) Notice: Subject to any disclaimer, the term of this patent is extended or adjusted under 35 U.S.C. 154(b) by 457 days.

(21) Appl. No.: 18/504,683

(22) Filed: Nov. 8, 2023

(65) Prior Publication Data

US 2024/0166515 A1 May 23, 2024

(30) Foreign Application Priority Data

Nov. 17, 2022 (KR) ........................ 10-2022-0154260

(51) Int. Cl.
*C01B 17/24* (2006.01)
*C01B 17/36* (2006.01)
*H01M 10/0562* (2010.01)

(52) U.S. Cl.
CPC .............. *C01B 17/24* (2013.01); *C01B 17/36* (2013.01); *H01M 10/0562* (2013.01); *H01M 2300/0068* (2013.01)

(58) Field of Classification Search
CPC ...................................................... C01B 17/24
See application file for complete search history.

(56) References Cited

U.S. PATENT DOCUMENTS 4,126,666 A 11/1978 Jacob et al.
8,377,411 B2 2/2013 Barker et al.
9,017,582 B2 4/2015 Rittmeyer et al.
(Continued)

FOREIGN PATENT DOCUMENTS

CN 104609376 5/2015
CN 113683059 11/2021
CN 110790239 1/2022
(Continued)

*Primary Examiner* — Peter F Godenschwager
(74) *Attorney, Agent, or Firm* — Fish & Richardson P.C.

(57) ABSTRACT

Disclosed is a method of producing lithium sulfide ($Li_2S$) without using hydrogen sulfide ($H_2S$) gas. Particularly, the method of producing lithium sulfide ($Li_2S$) includes preparing a starting material including a metal oxide by subjecting a mixed powder including an inorganic compound containing lithium and oxygen, a metal reducing agent, and sulfur (S) to synthesis reaction using mechanical force, preparing a mixed solution by mixing the starting material and a solvent, and obtaining a lithium sulfide ($Li_2S$) powder by removing the metal oxide from the mixed solution and then performing drying.

14 Claims, 4 Drawing Sheets

(56) References Cited

U.S. PATENT DOCUMENTS

2014/0037535 A1 2/2014 Miyashita

FOREIGN PATENT DOCUMENTS

| | | |
|---|---|---|
| CN | 112125322 | 4/2022 |
| EP | 0802159 | 10/1997 |
| JP | 4896520 | 3/2012 |
| JP | 4948659 | 6/2012 |
| JP | 5303428 | 10/2013 |
| JP | 5460283 | 4/2014 |
| JP | 2014-169196 | 9/2014 |

METHOD OF PRODUCING LITHIUM SULFIDE WITHOUT USING HYDROGEN SULFIDE GAS

CROSS-REFERENCE TO RELATED APPLICATION

This application claims priority from Korean Patent Application No. 10-2022-0154260, filed on Nov. 17, 2022, the disclosure of which is incorporated herein by reference in its entirety.

TECHNICAL FIELD

The present disclosure relates to a method of producing lithium sulfide ($Li_2S$) without using hydrogen sulfide ($H_2S$) gas.

BACKGROUND

Lithium sulfide has recently been increasingly needed as a material for solid electrolytes for all-solid-state lithium secondary batteries, and is used in various fields. An all-solid-state lithium secondary battery is configured such that an organic liquid electrolyte and a separator in a currently commercialized lithium secondary battery are replaced with a solid electrolyte. Since the solid electrolyte has nonflammable or flame-retardant properties, it is safer than the liquid electrolyte. Solid electrolytes are classified into oxide-based and sulfide-based solid electrolytes. Sulfide-based solid electrolytes are mainly used because they have higher lithium ion conductivity than oxide-based solid electrolytes and are stable in a wide voltage range.

Since lithium sulfide does not exist in the form of a natural mineral, it is synthesized from other lithium compounds. In general, lithium sulfide is known to be produced through methods of heating a lithium compound and sulfur or a sulfur compound, of reacting a strong alkali compound containing lithium with hydrogen sulfide ($H_2S$) in an aprotic organic solvent or aqueous solution in an inert atmosphere, of reacting lithium hydroxide (LiOH) with gaseous sulfur at a high temperature, and of reacting lithium carbonate with hydrogen sulfide ($H_2S$) at a high temperature.

Therefore, a more efficient method of producing lithium sulfide ($Li_2S$) than conventional methods is in need.

SUMMARY

An object of the present disclosure is to provide a method of producing lithium sulfide ($Li_2S$) without using toxic hydrogen sulfide ($H_2S$) gas as a reactant.

The objects of the present disclosure are not limited to the foregoing. The objects of the present disclosure will be able to be clearly understood through the following description and to be realized by the means described in the claims and combinations thereof.

The present disclosure provides a method of producing lithium sulfide ($Li_2S$) including preparing a starting material including a metal oxide by subjecting a mixed powder including an inorganic compound containing lithium and oxygen, a metal reducing agent, and sulfur (S) to synthesis reaction using mechanical force, preparing a mixed solution by mixing the starting material and a solvent, and obtaining a lithium sulfide ($Li_2S$) powder by removing the metal oxide from the mixed solution and then performing drying.

The inorganic compound may include any one selected from among $Li_2O$, $Li_2O_2$, LiOH, $LiCO_3$, $Li_2CO_3$, $LiNO_3$, and $Li_2SO_4$.

The metal reducing agent may include at least one selected from the group consisting of magnesium (Mg) powder, aluminum (Al) powder, silicon (Si) powder, and combinations thereof.

The mixed powder may further include carbon.

The mixed powder may be a mixture of the inorganic compound, the metal reducing agent, and the sulfur (S) in an equivalent ratio of 1-3:1-6:0-4.

The mechanical force may be formed using any one selected from the group consisting of a planetary mill, a vibration mill, an attrition mill, and combinations thereof.

In the method, preparing the starting material may be performed at room temperature for 1 to 300 minutes.

In the method, preparing the starting material may be performed in a sealed state in an inert atmosphere.

The starting material may include lithium sulfide ($Li_2S$) and the metal oxide.

The metal oxide may be magnesium oxide, aluminum oxide, silicon oxide, or a composite oxide thereof.

The solvent may include at least one selected from the group consisting of ethanol, methanol, isopropyl alcohol, and combinations thereof.

In the method, obtaining the lithium sulfide ($Li_2S$) powder may include removing only an oxide from the mixed solution using at least one process selected from among precipitation, centrifugation, and filtration.

In the method, obtaining the lithium sulfide ($Li_2S$) powder may include drying the mixed solution from which the oxide is removed through heat treatment in a vacuum at a temperature ranging from room temperature to 400° C. for 1 hour to 24 hours.

The method may not use hydrogen sulfide.

BRIEF DESCRIPTION OF THE DRAWINGS

The above and other features of the present disclosure will now be described in detail with reference to certain exemplary implementations thereof illustrated in the accompanying drawings, which are given hereinbelow by way of illustration only, and thus are not limitative of the present disclosure, and wherein.

DETAILED DESCRIPTION

The above and other objects, features and advantages of the present disclosure will be more clearly understood from the following preferred implementations taken in conjunction with the accompanying drawings. However, the present disclosure is not limited to the implementations disclosed herein, and may be modified into different forms. These implementations are provided to thoroughly explain the disclosure and to sufficiently transfer the spirit of the present disclosure to those skilled in the art.

It will be further understood that the terms "comprise", "include", "have", etc., when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it may be directly on the other element, or intervening elements may be present therebetween. Similarly, when an element such as a layer, film, area, or sheet is referred to as being "under" another element, it may be directly under the other element, or intervening elements may be present therebetween.

The present disclosure pertains to a method of producing lithium sulfide ($Li_2S$). Hereinafter, the present disclosure will be described in more detail with reference to the accompanying drawings.

Figure 1:
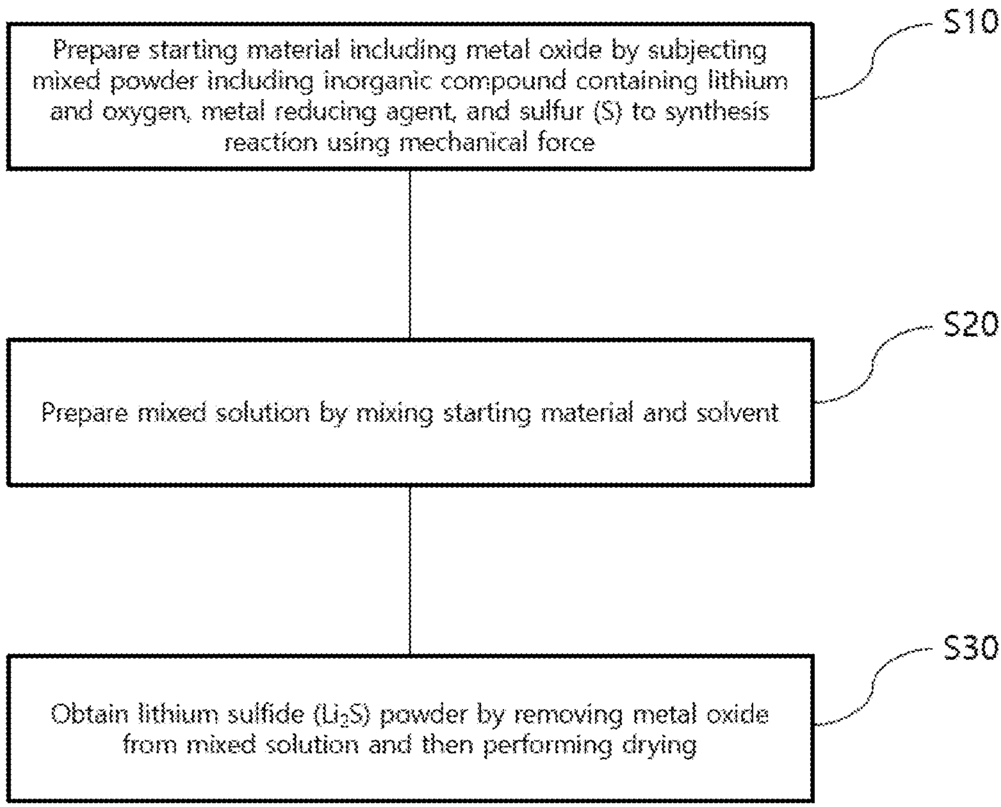
FIG. 1 is a flowchart showing an exemplary process of producing lithium sulfide ($Li_2S$)

FIG. 1 is a flowchart showing a process of producing lithium sulfide ($Li_2S$).

With reference thereto, the method of producing lithium sulfide ($Li_2S$) according to the present disclosure includes preparing a starting material including a metal oxide by subjecting a mixed powder including an inorganic compound containing lithium and oxygen, a metal reducing agent, and sulfur (S) to synthesis reaction using mechanical force (S10), preparing a mixed solution by mixing the starting material and a solvent (S20), and obtaining a lithium sulfide ($Li_2S$) powder by removing the metal oxide from the mixed solution and then performing drying (S30).

First, in S10, a mixed powder including an inorganic compound containing lithium and oxygen, a metal reducing agent, and sulfur (S) is prepared.

The inorganic compound may include any one selected from among $Li_2O$, $Li_2O_2$, LiOH, $LiCO_3$, $Li_2CO_3$, $LiNO_3$, and $Li_2SO_4$.

The metal reducing agent may include at least one selected from the group consisting of magnesium (Mg) powder, aluminum (Al) powder, silicon (Si) powder, and combinations thereof.

The mixed powder may be obtained by mixing the inorganic compound, metal reducing agent, and sulfur (S) in an equivalent ratio of 1-3:1-6:0-4.

$Li_2O+Mg+S=Li_2S+MgO$ (Scheme 1)

$3Li^2O+2Al+3S=3Li_2S+Al_2O_3$ (Scheme 2)

$Li_2O_2+2Mg+S=Li_2S+2MgO$ (Scheme 3)

$1.5Li_2O^2+2Al+1.5S=1.5Li_2S+Al_2O_3$ (Scheme 4)

$2LiOH+2Mg+S=Li_2S+2MgO+H_2$ (Scheme 5)

$3LiOH+2Al+1.5S=1.5Li_2S+Al_2O_3+1.5H_2$ (Scheme 6)

$Li_2CO_3+3Mg+S=Li_2S+3MgO+C$ (Scheme 7)

$Li_2CO_3+2Al+S=Li_2S+Al_2O_3+C$ (Scheme 8)

$Li_2SO_4+4Mg=Li_2S+4MgO$ (Scheme 9)

$1.5Li_2SO_4+4Al=1.5Li_2S+2Al_2O_3$ (Scheme 10)

$2LiNO_3+6Mg+S=Li_2S+6MgO+N_2$ (Scheme 11)

$2LiNO_3+4Al+S=Li_2S+2Al_2O_3+N_2$ (Scheme 12)

$2Li_2O+Si+2S=2Li_2S+SiO_2$ (Scheme 13)

Specifically, the starting material may be prepared by subjecting the mixed powder mixed in an equivalent ratio according to the above schemes to synthesis reaction using mechanical force. As shown in Schemes, the starting material may include a metal oxide. Here, the metal oxide may be magnesium oxide, aluminum oxide, silicon oxide, or composite oxides thereof.

Specifically, the starting material may be composed of lithium sulfide ($Li_2S$) and the metal oxide.

Meanwhile, when aluminum (Al) is used as a reducing agent in the mixed powder, a small amount of lithium-aluminum composite oxide may be partially formed. In addition, when $Li_2CO_3$ is used as the inorganic compound, carbon may be further included in the mixed powder as shown in Schemes 7 and 8.

The mechanical force used for the synthesis reaction in S10 is not particularly limited, but may be formed using any one selected from the group consisting of a planetary mill, a vibration mill, an attrition mill, and combinations thereof.

In S10, a self-propagating high-temperature synthesis (SHS) method may be applied for the synthesis reaction.

In the synthesis reaction in S10, the starting material may be prepared by applying mechanical force to the mixed powder at room temperature for 1 to 300 minutes in a sealed state in an inert atmosphere. Here, room temperature may be 0° ° C. to 80° C.

Specifically, in the synthesis reaction in S10, the mixed powder may be placed in a planetary mill along with zirconia balls in an inert atmosphere and then sealed. Here, the inert atmosphere is an atmosphere containing an inert gas. The inert gas may be, for example, nitrogen, argon, etc., but is not necessarily limited thereto, and any inert gas typically useful in the art may be used.

Therefore, the production method is characterized by synthesizing the starting material from the mixed powder through mechanochemical reaction using mechanical force.

Subsequently, in S20, a mixed solution is prepared by mixing the starting material and a solvent.

The solvent is not particularly limited, and any organic solvent typically useful in the art may be used. Specifically, the solvent may include at least one selected from the group consisting of ethanol, methanol, isopropyl alcohol, and combinations thereof.

Specifically, in S20, only lithium sulfide ($Li_2S$) may be selectively dissolved by adding the solvent to the starting material, which is a reaction product, followed by stirring.

Finally, in S30, a lithium sulfide ($Li_2S$) powder may be obtained by removing the metal oxide from the mixed solution, followed by drying.

Specifically, in S30, only the oxide may be removed from the mixed solution using at least one process selected from among precipitation, centrifugation, and filtration.

Thus, the solvent is allowed to evaporate from the solution remaining after removal of the metal oxide from the mixed solution. Subsequently, the product resulting from evaporation of the solvent may be dried through heat treatment in a vacuum at a temperature ranging from room temperature to 400° C. for 1 hour to 24 hours to completely remove the residual solvent, thereby obtaining a pure lithium sulfide ($Li_2S$) powder. Here, room temperature may be 0° ° C. to 80° C.

Therefore, in the present disclosure, there is provided a method of producing lithium sulfide ($Li_2S$) that may be realized at room temperature rather than a high temperature by synthesizing lithium sulfide and a metal oxide using dry mechanochemical reaction at room temperature, not high temperature, rather than using toxic hydrogen sulfide as a reactant, and then separating and removing the metal oxide.

A better understanding of the present disclosure may be obtained through the following examples. These examples are merely set forth to illustrate the present disclosure, and are not to be construed as limiting the scope of the present disclosure.

Example 1 ($Li_2O$+Mg+S)

0.448 g of lithium oxide ($Li_2O$), 0.368 g of magnesium (Mg) powder, and 0.481 g of sulfur (S) powder were placed in a zirconia-made container with an inner volume of 35 ml along with 21 zirconia balls having a diameter of 10 mm in a glove box, sealed, and then taken out to the atmosphere. Here, the inorganic compound, metal reducing agent, and sulfur (S) were mixed in an equivalent ratio of 1:1:1.

Subsequently, the container was mounted on a vibration mill (MM 400, Retsch), followed by milling at 25 Hz for 7 minutes. After termination of milling, the container was placed in a glove box and a powder was collected. The powder and anhydrous ethanol were placed in a vessel for centrifugation, sealed, taken out to the atmosphere, mounted on a centrifuge, and rotated at 10,000 rpm for 10 minutes. Subsequently, after termination of centrifugation, the solution was placed in a round-bottom flask, which was then connected to a vacuum exhaust device to allow ethanol to evaporate, thereby obtaining a lithium sulfide powder.

Example 2 ($Li_2O$+Mg+S)

0.598 g of lithium oxide ($Li_2O$), 0.490 g of magnesium (Mg) powder, and 0.641 g of sulfur (S) powder were placed in a silicon nitride-made container with an inner volume of 80 ml along with 30 zirconia balls having a diameter of 10 mm in a glove box, sealed, and then taken out to the atmosphere. The container was mounted on a planetary mill (P7 Premium, Fritsch), followed by milling at 800 rpm for 4 hours. Sample collection and MgO separation were the same as in Example 1.

Here, the inorganic compound, metal reducing agent, and sulfur (S) were mixed in an equivalent ratio of 1:1:1.

Example 3 ($Li_2CO_3$+3Mg+S)

In a glove box, 0.739 g of lithium carbonate ($Li_2CO_3$), 0.736 g of magnesium (Mg) powder, and 0.321 g of sulfur (S) powder were milled in the same manner as in Example 2, and MgO was separated.

Here, the inorganic compound, metal reducing agent, and sulfur (S) were mixed in an equivalent ratio of 1:3:1.

Example 4 (2LiOH+2Mg+S)

0.719 g of lithium hydroxide (LiOH), 0.736 g of magnesium (Mg) powder, and 0.481 g of sulfur (S) powder were milled in the same manner as in Example 2, and MgO was separated.

Here, the inorganic compound, metal reducing agent, and sulfur (S) were mixed in an equivalent ratio of 2:2:1.

Example 5 ($Li_2SO_4$+4Mg)

0.6596 g of lithium sulfate ($Li_2SO_4$) and 0.5834 g of magnesium (Mg) powder were milled in the same manner as in Example 2, and the reaction product except for $Li_2S$ was separated in the same manner as in Example 1. Here, the inorganic compound and the metal reducing agent were mixed in an equivalent ratio of 1:4.

For reference, in Example 5, sulfur was not separately added because sulfur in an equivalent ratio was already included in lithium sulfate.

Example 6 (3.15$Li_2O$+2Al+3S)

0.627 g of lithium oxide ($Li_2O$), 0.363 g of aluminum (Al) powder, and 0.641 g of sulfur (S) were milled in the same manner as in Example 2, and reaction products except for $Li_2S$ were separated in the same manner as in Example 1.

Here, the inorganic compound, metal reducing agent, and sulfur (S) were mixed in an equivalent ratio of 3.15:2:3.

Example 7 (2$Li_2O$+Si+2S)

0.5976 g of lithium oxide ($Li_2O$), 0.2808 g of silicon (Si) powder, and 0.6413 g of sulfur (S) were milled in the same manner as in Example 2, and reaction products except for $Li_2S$ were separated in the same manner as in Example 1.

Here, the inorganic compound, metal reducing agent, and sulfur (S) were mixed in an equivalent ratio of 2:1:2.

Test Example 1

The samples were analyzed through X-ray diffraction (XRD) in order to confirm components before and after removal of metal oxide in the samples prepared according to Examples.

Figure 2:
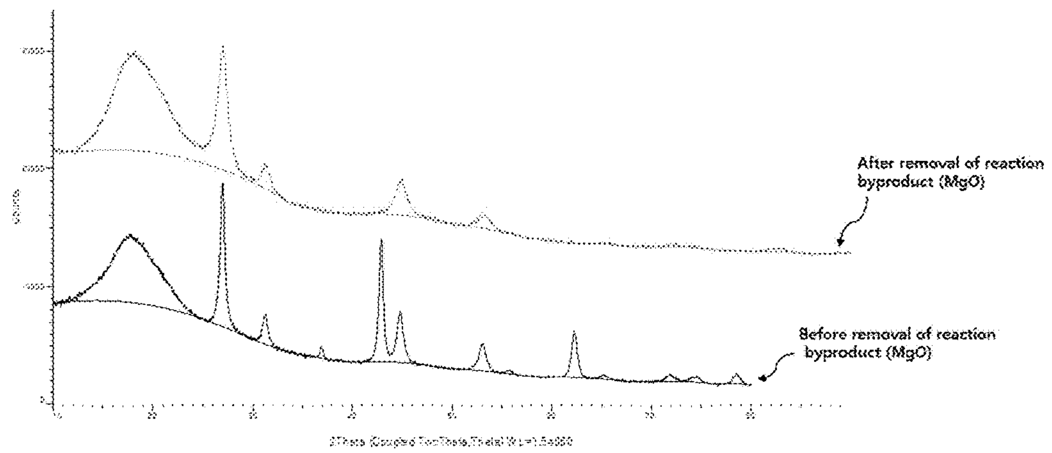
FIG. 2 shows exemplary results of X-ray diffraction (XRD) analysis of the specimen before and after removal of metal oxide.

FIG. 2 shows results of X-ray diffraction (XRD) analysis of the specimen before and after removal of metal oxide in Example 1.

With reference to FIG. 2, before separation of metal oxide (MgO) after termination of milling, a mixture including $Li_2S$ and MgO was obtained, and after separation of metal oxide (MgO) after termination of milling, there were no crystalline phases other than $Li_2S$.

Figure 3:
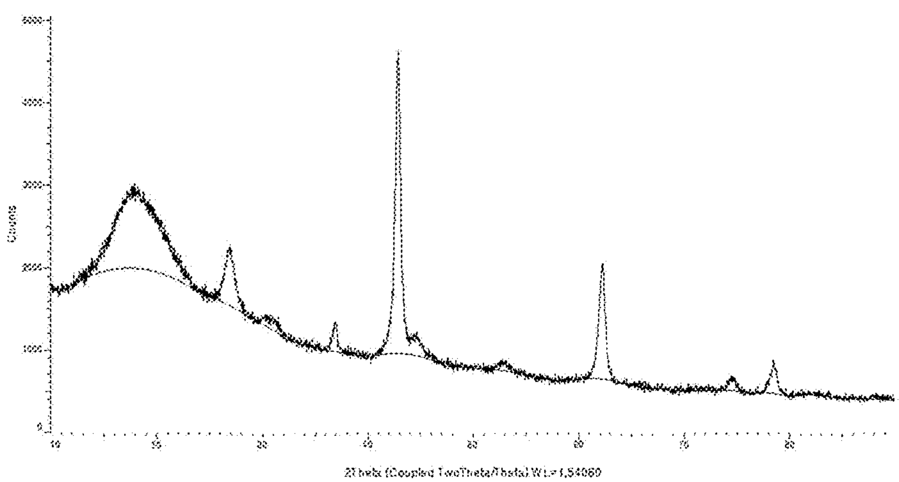
FIGS. 3 to 5 show exemplary results of X-ray diffraction (XRD) analysis of specimens before removal of metal oxide.

FIG. 3 shows results of X-ray diffraction (XRD) analysis of the specimen before removal of metal oxide in Example 3.

With reference to FIG. 3, a mixture including $Li_2S$ and MgO was obtained before separation of metal oxide after termination of milling. Also, the mixture was confirmed to include carbon (C) based on carbon floating on the solution in the process of separating MgO by mixing with the organic solvent.

Figure 4:
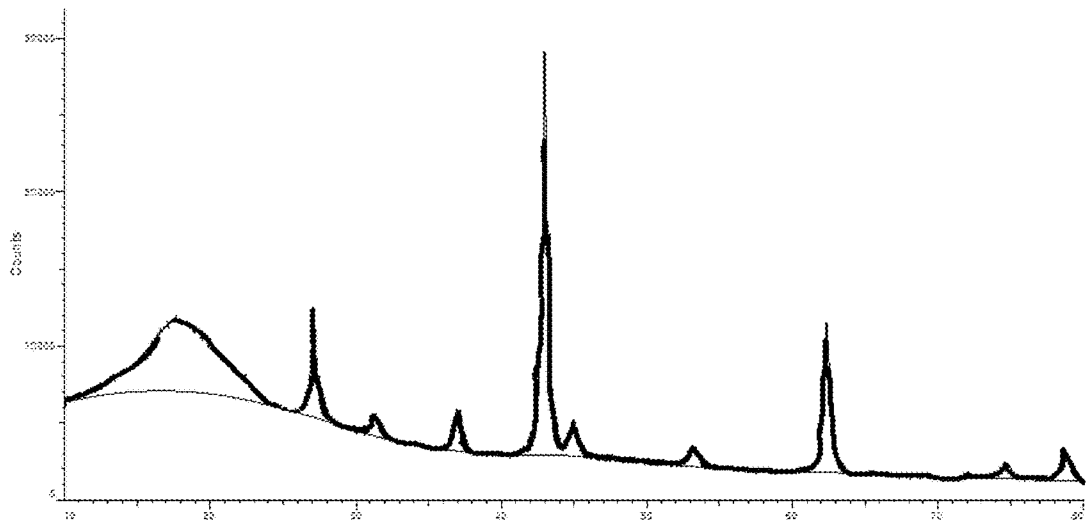

FIG. 4 shows results of X-ray diffraction (XRD) analysis of the specimen before removal of metal oxide in Example 5.

With reference to FIG. 4, it can be confirmed that a mixture including $Li_2S$ and MgO was obtained before separation of metal oxide after termination of milling.

Figure 5:
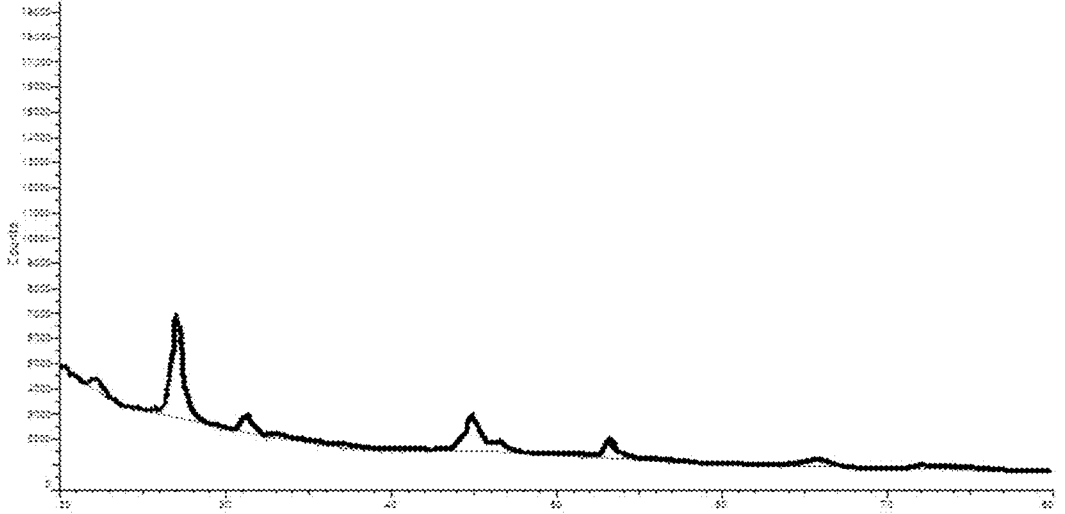

FIG. 5 shows results of X-ray diffraction (XRD) analysis of the specimen before removal of metal oxide in Example 6.

With reference to FIG. 5, it can be confirmed that a mixture including $Li_2S$, $Al_2O_3$, and $LiAlO_2$ was obtained before separation of metal oxide after termination of milling.

Figure 6:
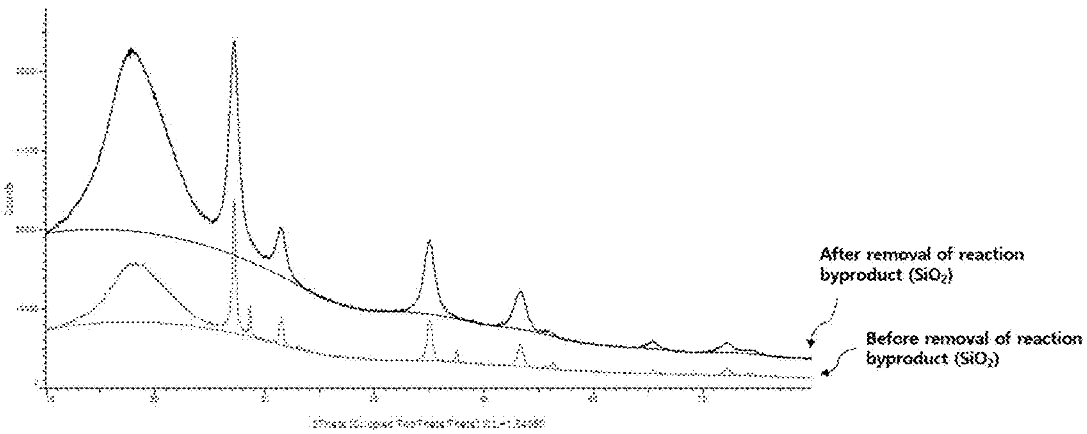
FIG. 6 shows exemplary results of X-ray diffraction (XRD) analysis of the specimen before and after removal of metal oxide.

FIG. 6 shows results of X-ray diffraction (XRD) analysis of the specimen before and after removal of metal oxide in Example 7.

With reference to FIG. 6, a mixture including $Li_2S$, $SiO_2$, and a small amount of unreacted Si was obtained before separation of metal oxide ($SiO_2$) after termination of milling, and there were no crystalline phases other than $Li_2S$ after separation of metal oxide ($SiO_2$) after termination of milling.

Test Example 2—Purity of $Li_2S$ Powder

The purity of the sample ($Li_2S$) prepared according to Examples 1 to 7 was measured, and the results thereof are shown in Table 1 below. Here, ICP-OES and AAS were used as analyzers for measuring purity.

TABLE 1

| Component | Mg | Si | Zr | Ni | Fe | Cu | Zn | Ca | Al | Mn | Ti | K |
|---|---|---|---|---|---|---|---|---|---|---|---|---|
| Amount (wt %) | 0.15 | 0.048 | 0.024 | <0.01 | <0.01 | <0.01 | <0.01 | <0.01 | <0.01 | <0.01 | <0.01 | <0.01 |
| Analyzer | ICP-OES | | | | | | | | | | | AAS |

With reference to Table 1, the lithium sulfide ($Li_2S$) powder produced through the method according to an implementation of the present disclosure can be obtained at a purity of 99% or more (based on metal elements) by rapidly synthesizing lithium sulfide and a metal oxide using dry mechanochemical reaction and then separating and removing the metal oxide.

As is apparent from the above description, the present disclosure can provide a method of producing lithium sulfide ($Li_2S$) without using toxic hydrogen sulfide ($H_2S$) gas as a reactant.

The present disclosure can provide a method of producing lithium sulfide ($Li_2S$) that can be realized at room temperature rather than a high temperature by synthesizing lithium sulfide and a metal oxide using dry mechanochemical reaction and then separating and removing the metal oxide.

The effects of the present disclosure are not limited to the above-mentioned effects. It should be understood that the effects of the present disclosure include all effects that can be inferred from the description of the present disclosure.

Although specific implementations of the present disclosure have been described with reference to the accompanying drawings, those skilled in the art will appreciate that the present disclosure may be embodied in other specific forms without changing the technical spirit or essential features thereof. Thus, the implementations described above should be understood to be non-limiting and illustrative in every way.

What is claimed is:

1. A method of producing lithium sulfide ($Li_2S$) comprising:

preparing a starting material by subjecting a mixed powder to synthesis reaction, wherein the starting material includes a metal oxide, and wherein the mixed powder includes an inorganic compound comprising lithium and oxygen, a metal reducing agent, and sulfur (S);

preparing a mixed solution by mixing the starting material and a solvent; and obtaining a lithium sulfide ($Li_2S$) powder by removing the metal oxide and drying the mixed solution.

2. The method of claim 1, wherein the inorganic compound is selected from the group consisting of $Li_2O$, $Li_2O_2$, LiOH, $LiCO_3$, $Li_2CO_3$, $LiNO_3$, and $Li_2SO_4$.

3. The method of claim 1, wherein the metal reducing agent is selected from the group consisting of magnesium (Mg) powder, aluminum (Al) powder, silicon (Si) powder, and combinations thereof.

4. The method of claim 1, wherein the mixed powder further comprises carbon.

5. The method of claim 1, wherein the mixed powder comprises the inorganic compound, the metal reducing agent, and the sulfur (S) in a ratio of 1-3:1-6:0-4.

6. The method of claim 1, wherein the starting material is prepared using mechanical force, the mechanical force being produced by using any one selected from the group consisting of a planetary mill, a vibration mill, an attrition mill, and combinations thereof.

7. The method of claim 1, wherein preparing the starting material is performed at room temperature for 1 to 300 minutes.

8. The method of claim 1, wherein preparing the starting material is performed in a sealed state.

9. The method of claim 1, wherein the starting material comprises lithium sulfide ($Li_2S$) and the metal oxide.

10. The method of claim 1, wherein the metal oxide comprises magnesium oxide, aluminum oxide, silicon oxide, or a composite oxide thereof.

11. The method of claim 1, wherein the solvent comprises at least one selected from the group consisting of ethanol, methanol, isopropyl alcohol, and combinations thereof.

12. The method of claim 1, wherein obtaining the lithium sulfide ($Li_2S$) powder comprises removing the metal oxide from the mixed solution using at least one process selected from the group consisting of precipitation, centrifugation, and filtration.

13. The method of claim 1, wherein obtaining the lithium sulfide ($Li_2S$) powder comprises drying the mixed solution from which the metal oxide is removed through heat treatment in a vacuum at a temperature ranging from room temperature to 400° C. for 1 hour to 24 hours.

14. The method of claim 1, wherein hydrogen sulfide is not used as a reactant.

* * * * *